United States Patent [19]

Barber

[11] Patent Number: 4,582,885

[45] Date of Patent: Apr. 15, 1986

[54] SHAPED PLASTIC ARTICLES HAVING REPLICATED MICROSTRUCTURE SURFACES

[75] Inventor: Elaine C. Barber, Lake Elmo, Minn.

[73] Assignee: Minnesota Mining and Manufacturing Company, St. Paul, Minn.

[21] Appl. No.: 104,862

[22] Filed: Dec. 18, 1979

Related U.S. Application Data

[62] Division of Ser. No. 926,325, Jul. 20, 1978.

[51] Int. Cl.$^4$ .................................. C08G 77/04
[52] U.S. Cl. ........................................ 528/28; 264/22; 156/272.2; 427/44; 428/447; 522/172
[58] Field of Search .............. 528/28, 26; 204/159.13, 204/159.22, 159.23, 159.16, 159.19; 264/22; 156/272.2; 427/44; 428/447

[56] References Cited

U.S. PATENT DOCUMENTS

| | | | |
|---|---|---|---|
| 2,310,790 | 2/1943 | Jungersen | 350/109 |
| 2,407,680 | 9/1946 | Palmquist et al. | 350/105 |
| 2,482,598 | 9/1949 | Roos | 356/243 |
| 2,524,862 | 10/1950 | White | 204/159.16 |
| 3,140,340 | 7/1964 | Weber | 350/67 |
| 3,169,945 | 2/1965 | Hostettler et al. | 528/355 |
| 3,190,947 | 6/1965 | Norcross | 264/166 |
| 3,297,745 | 1/1967 | Fekete et al. | 560/26 |
| 3,334,958 | 8/1967 | Appeldorn | 350/452 |
| 3,369,949 | 2/1968 | Forrest | 156/232 |
| 3,448,171 | 6/1969 | Damusis | 525/440 |
| 3,457,326 | 7/1969 | Kienle | 525/27 |
| 3,499,852 | 3/1970 | Schroeder et al. | 528/45 |
| 3,511,563 | 5/1970 | Erwin | 353/38 |
| 3,560,417 | 2/1971 | Pizzi | 524/24 |
| 3,565,978 | 2/1971 | Folger et al. | 264/1.3 |
| 3,577,262 | 5/1971 | Nordstrom | 428/334 |
| 3,577,264 | 5/1971 | Nordstrom | 428/334 |
| 3,641,199 | 2/1972 | Niederhauser | 525/440 |
| 3,666,527 | 5/1972 | Feldstein et al. | 427/306 |
| 3,667,946 | 6/1972 | Sturdevant | 430/1 |
| 3,678,014 | 7/1972 | Suzuki et al. | 526/301 |
| 3,689,346 | 9/1972 | Rowland | 156/245 |
| 3,697,485 | 10/1972 | Rambosek et al. | 528/57 |

(List continued on next page.)

FOREIGN PATENT DOCUMENTS

| | | |
|---|---|---|
| 859711 | 10/1976 | Belgium . |
| 2247329 | 10/1974 | France . |
| 1283653 | 8/1972 | United Kingdom . |
| 1323728 | 7/1973 | United Kingdom . |
| 1342278 | 9/1973 | United Kingdom . |
| 1344918 | 1/1974 | United Kingdom . |
| 1387355 | 3/1975 | United Kingdom . |
| 1399257 | 7/1975 | United Kingdom . |
| 1453429 | 10/1976 | United Kingdom . |
| 1481472 | 7/1977 | United Kingdom . |

(List continued on next page.)

OTHER PUBLICATIONS

Journal of Applied Physics, vol. 45, No. 10 (Oct. 1974) pp. 4557–4562.
"Block Copolymers", Allport and Janes Pub. Wiley & Sons, N.E. (1973) Chapter 8c.
"Polymer Blends & Composites", Mason & Sperling, Pub. by Plenum Press, N.Y. (1976) pp. 153–166.
"Polymer Engineering & Science", vol. 11, No. 4, pp. 369–376.

(List continued on next page.)

*Primary Examiner*—Melvyn I. Marquis
*Attorney, Agent, or Firm*—Donald M. Sell; James A. Smith; William G. Ewert

[57] ABSTRACT

An article comprising a shaped, plastic layer or body comprising crosslinked polymer with hard and soft segments or moieties and having a microstructure-bearing surface is prepared by a process comprising filling a mold master, bearing or encoded with the microstructure to be replicated, with a fluid, castable, one-part, preferably solvent-free, radiation addition-polymerizable, crosslinkable, synthetic, organic oligomeric composition (or precursors thereof) having "hard" segments and "soft" polysiloxane segments, exposing the resulting case composition to radiation, preferably actinic radiation such as ultraviolet radiation, and thereby forming said article, e.g., a retroreflective cube-corner sheeting, Fresnel lens or video disc.

4 Claims, 18 Drawing Figures

U.S. PATENT DOCUMENTS

| | | | |
|---|---|---|---|
| 3,700,643 | 10/1972 | Smith et al. | 526/282 |
| 3,711,444 | 1/1923 | Allen et al. | 528/49 |
| 3,795,534 | 3/1974 | McHalso et al. | 427/240 |
| 3,810,804 | 5/1974 | Rowland | 156/245 |
| 3,819,586 | 6/1974 | Rudolph et al. | 528/45 |
| 3,826,650 | 7/1974 | Schlesinger | 430/156 |
| 3,850,770 | 11/1974 | Juna et al. | 430/284 |
| 3,853,595 | 12/1974 | Pedginski et al. | 428/156 |
| 3,878,036 | 4/1975 | Chang | 428/425.6 |
| 3,882,214 | 5/1975 | Nosker et al. | 264/106 |
| 3,886,865 | 6/1975 | Ohto et al. | 101/456 |
| 3,908,056 | 9/1975 | Anderson | 428/142 |
| 3,931,117 | 1/1976 | Leonard | 528/45 |
| 3,931,373 | 1/1976 | Beattie | 264/2.3 |
| 3,935,359 | 1/1976 | Rowland | 428/172 |
| 3,960,572 | 6/1976 | Ibata et al. | 430/283 |
| 3,972,593 | 8/1976 | Appeldorn et al. | 350/452 |
| 3,976,676 | 8/1976 | Lohse et al. | 556/449 |
| 3,980,393 | 9/1976 | Heasley et al. | 556/437 |
| 4,013,698 | 3/1977 | Lohse et al. | 556/437 |
| 4,022,855 | 5/1977 | Hamblen | 264/1.4 |
| 4,025,159 | 5/1977 | McGrath | 350/105 |
| 4,049,861 | 9/1977 | Nozari | 428/220 |
| 4,065,587 | 12/1977 | Ting | 427/54.1 |
| 4,077,926 | 3/1978 | Sanderson | 525/112 |
| 4,077,932 | 3/1978 | Columbus | 524/114 |
| 4,081,276 | 3/1978 | Crivello | 430/269 |
| 4,082,433 | 4/1978 | Appeldorn et al. | 350/452 |
| 4,098,742 | 7/1978 | Mueller | 524/588 |
| 4,116,786 | 9/1978 | Hodakowski | 204/159.13 |
| 4,125,678 | 11/1978 | Stvan et al. | 428/514 |
| 4,126,726 | 11/1978 | Soeding | 428/163 |
| 4,130,708 | 12/1978 | Friedlander et al. | 528/28 |
| 4,157,931 | 6/1979 | Bricot et al. | 156/230 |
| 4,224,357 | 9/1980 | Iwai et al. | 204/159.2 |

OTHER PUBLICATIONS

"Polyurethanes: Chemistry & Technology", Part I (1962) Chapter III.

"Handbook of Epoxy Resins", H. Lee and K. Neville (1967) Appendix 5-1.

Epoxy Resin Technology", P. F. Bruins (1968) Chapters 1 and 2.

"Encyclopedia of Chemical Technology", 2nd Ed., vol. 8 (1965) pp. 313-317.

"Basic Principals of Organic Chemistry", J. D. Roberts & M. C. Caserio (1964) pp. 518-519.

Journal of Polymer Science, Part A-1, vol. 5 (1967) pp. 2693-2699.

Technical Bulletin F-42464 of Union Carbide Corp.

"Handbook of Epoxy Resins", McGraw-Hill Book Co., (1967), Appendix 4-1.

Polymer Handbook, III-Brandrup & Immergut, Interscience Pub. (1967) pp. 61-73.

"Photochemistry", Calvert & Pitts, Pub. John Wiley & Sons (1966) Chapter 5.

"Diffraction Grating Catalog", PTR Optics Corp. & Bulletins ACA1004-1-1270 & ACA1006-1-1270 of Angenieux Corp of America (1974).

"Encyclopedia of Polymer Science & Technology", vol. 8, (1968) pp. 651-666.

"Principles of Electroplating & Electroforming", 3rd. Ed., McGraw-Hill Co., Inc. (1949) Chapter VIII.

"Science", vol. 196, No. 4293 (1977) pp. 945-949.

"Optics & Laser Technology" (Aug. 1977) pp. 169-174.

Journal of Optical Society of America, vol. 48, No. 7 (Jul. 1958) pp. 496-499.

Journal of Applied Optics, vol. 9, No. 12 (Dec. 1970) pp. 2720-2724.

"Encyclopedia of Polymer Technology", vol. 4, (1966) Interscience Pubs., pp. 63-65.

"Spectrum" (Jan., 1975) p. 67.

"Encyclopedia of Polymer Science and Technology", vol. 1 (1976) pp. 521-543.

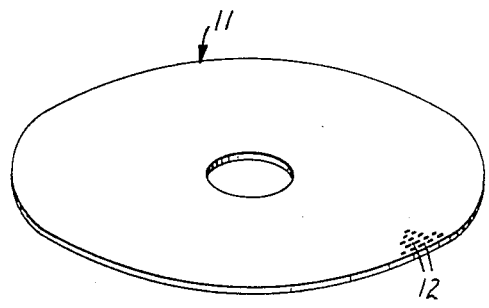
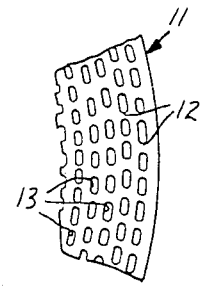
Fig. 7  Fig. 8
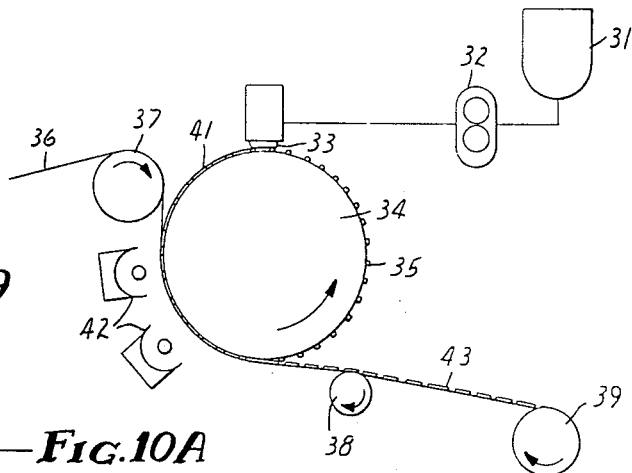
Fig. 9

Fig. 10F

SHAPED PLASTIC ARTICLES HAVING REPLICATED MICROSTRUCTURE SURFACES

This is a division of Ser. No. 926,325 filed July 20, 1978.

This invention relates to the replication of surfaces bearing microstructure. In another aspect it relates to shaped plastic articles, such as retroreflecting cube-corner sheeting, Fresnel lens elements, diffraction gratings, video discs, and ophthalmic lenses, having replicated microstructure-bearing surfaces, and to a process for the preparation of the articles. In another aspect, it relates to novel castable radiation curable oligomers, a process for their preparation, and the use of such material in making said replicated plastic articles.

Many materials, techniques and processes have been proposed, patented or used for replicating various microstructure-bearing surfaces in the form of embossed, cast or molded plastic articles, e.g., see J. of Applied Physics, Vol. 45, No. 10, p. 4557, October, 1974. Some of these have been of practical value though of limited application in many instances while others have been found wanting as impractical, especially where the object has been high fidelity and durability of replication or mass production capability. In many cases, the progress in this art has been stymied by lack of suitable replicating materials.

For example, in the area of retroreflective cube-corner sheetings, used as traffic signs and the other applications where light reflection is used for traffic direction and safety, U.S. Pat. No. 3,689,346 (Rowland) discloses a process for the continuous replication of such articles by depositing a crosslinkable, partially polymerized resin, such as certain acrylic acid ester resins, on a negative molding surface to be replicated, and exposing the resin to actinic light or heat to solidify the resin. The resins used typically exhibited relatively high levels of shrinkage upon solidifying or curing, thus giving rise to optical imperfections in the cube-corner microstructure, that is, changes in the angles between the faces of the cube-corner which produce light scattering rather than the desired maximum retroreflectivity. Attempts to overcome such shortcomings are described in U.S. Pat. No. 3,935,359 (Rowland) which discloses filling further resin in the void resulting from the shrinkage, and U.S. Pat. No. 3,980,393 (Heasley et al) which discloses using a lens system in conjunction with the cube-corner structure in order to compensate for the shrinkage. Such modifications are, of course, costly and demonstrate a need for replicating materials which do not significantly shrink and so cause optical imperfections in the replication.

An example where plastics have been used in replication of optical surfaces or elements in U.S. Pat. No. 3,931,373 (Beattie) which discloses replicating ophthalmic lenses from plastic compositions, such as methyl methacrylate, by use of a replicating mold made of certain polymeric materials, such as certain copolymers of styrene and methyl methacrylate, to prevent distortion of lenses during cure. French Pat. No. 2,247,329 discloses making replicas of video discs using ultra-violet radiation curable acrylics and epoxies. U.S. Pat. No. 3,334,958 (Appledorn) discloses Fresnel lens elements stamped from polymerized methyl methacrylate using molds made from machined master lenses.

Other U.S. patents disclosing replication of various articles using plastic compositions are U.S. Pat. Nos. 2,310,790 (Jungerson), 2,482,598 (Roos), 3,565,978 (Folger et al), 3,190,947 (Norcros), 3,369,949 (Forrest) 3,667,946 (Sturderant), 2,524,862 (White); the replication process of these patents require high molding temperatures or pressures which cause loss of fidelity in the replicated structure, use of solvents which require a long time to evaporate, long cure cycles, curable materials which have a limited "pot" life, or result in replicated articles having limited toughness and dimensional stability and with severe shrinkage.

Though oligomers or cured polymers with "hard" and "soft" segments or blocks have been disclosed in the prior art, e.g., see "Block Copolymers", Allport and Janes, published by Wiley & Sons, N.E. Chap. 8C, (1973), "Polymer Blends & Copolymers", Manson & Sperling, published by Plenum Press, N.Y., p. 153-166, (1976), "Polymer Engineering & Science", Vol. 11, No. 4, p. 369, (1971), "Encyclopedia of Polymer Science & Technology", Kirk-Othmer, Suppl., Vol. 1, p. 521-543 (1976, and U.S. Pat. Nos. 3,560,417 (Pizzi et al) and 4,077,932 (Columbus), those materials have not been disclosed as useful in making shaped plastic articles comprising crosslinked polymer and having replicated microstructure surfaces.

Briefly, in one aspect, this invention provides an article comprising a shaped, plastic, monolithic layer (or body) comprising certain crosslinked polymer and having one or more, like or different, replicated microstructure-bearing surfaces. An example of such article is a traffic control sign comprising a layer in the form of a self-supporting or free film or sheet of said crosslinked polymer and having on one side a microstructure-bearing surface in the form of a replicated array of retroreflective cube-corners, the other side of which sheet can be a replicated "flat" surface. Such articles are prepared by a process comprising filling a mold master, bearing the microstructure to be replicated, with a fluid, castable, one-part, preferably solvent-free, radiation addition-polymerizable, crosslinkable, oligomeric composition (or precursors thereof) having both "hard" segments and "soft" polysiloxane segments, exposing the resulting cast composition to radiation, preferably actinic radiation such as ultraviolet radiation, and thereby forming said article. Said process lends itself to rapid, mass production of such articles with no adverse environmental impact because no or only a minor amount of solvent or other volatiles are evolved and it can be carried out at ambient temperatures and pressures. The process also lends itself to replication of articles with microstructure comprising utilitarian discontinuities, such as projections and depressions, which are readily released from the mold master without loss of the detail of the master and with retention of the replication of such detail under a wide variety of conditions during use. The articles can be formed with a wide variety of desired properties, such as toughness, flexibility, optical clarity or homogeneity, and resistance to common solvents, the microstructure of such articles having high thermal dimensional stability, resistance to abrasion and impact, and integrity even when the articles are bent, e.g., 180°. The physical properties of the crosslinked polymer can be varied by proper selection of the oligomeric composition. The tensile strengths of the polymer can be varied from 70 to 700 kg/cm$^2$, the modulus of elasticity can be varied from 140 to 14,000 kg/cm$^2$, and the elongation-to-break can be varied from 5 to 300%. The optical homogenity of the polymer is manifested by at least 91% transmission of light, haze of less than 5%, and birefringence, Δn, of less than 0.002, and the flexibility is manifested by desirable dynamic sheer moduli over a wide temperature range, e.g., 23° to 120° C.

FIG. 7 is an isometric view of a replicated video disc of this invention;

FIG. 8 is an enlarged view of a portion of FIG. 7;

FIG. 9 is a schematic diagram of apparatus useful in making a sheet of cube-corner elements of FIGS. 3 and 4; and FIGS. 10A–10I are diagrams of illustrative profiles of various replicated microstructures of this invention.

The term "microstructure", used herein in the context of a shaped article having a surface bearing microstructure, means the configuration of a surface which depicts or characterizes the predetermined desired utilitarian purpose or function of said article. Discontinuities, such as projections and indentations, in the surface will deviate in profile from the average profile or center line drawn through the microstructure such that the sum of the areas embraced by the surface profile above the line is equal to the sum of those areas below the line, said line being essentially parallel to the nominal surface (bearing the microstructure) of the article. The heights of said deviations will be ±0.005 μm to ±750 μm through a representative characteriistic length of the surface, e.g., 1 to 30 cm. Said average profile, or center line, can be plano, concave, convex, aspheric or combinations thereof. Articles where said deviations are of low order, e.g., from ±0.005 μm to 0.1 μm or, preferably, to ±0.05 μm, and said deviations are of infrequent or minimal occurrence, i.e., the surface is free of any significant discontinuities, are those where the microstructure-bearing surface is an essentially "flat" or "perfectly smooth" surface, such articles being useful, for example, as precision optical elements or elements with a precision optical interface, such as ophthalmic lenses. Articles where said deviations are of said low order and of frequent occurrence are those, for example, bearing utilitarian discontinuities, as in the case of articles having anti-reflective microstructure. Articles where said deviations are of high order, e.g., from ±0.1 μm to ±750 μm, and attributable to microstructure comprising a plurality of utilitarian discontinuities which are the same or different and spaced apart or contiguous in a random or ordered manner, are articles such as retroreflective cube-corner sheeting, linear Fresnel lenses, and video discs. The microstucture-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles. It may be necessary or desirable to select a particular oligomeric composition whose shrinkage upon curing does not result in said interfering extraneous discontinuities, e.g., a composition which shrinks only 2 to 6%.

The above described profiles and the dimensions and spacing of said discontinuities are those discernible by an electron microscope at 1000X to 100,000X or an optical microscope at 10X to 1000X.

Figure 10A:
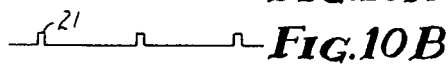
Figure 10B:
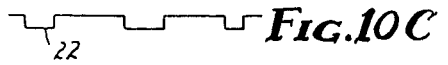
Figure 10C:
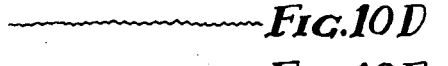
Figure 10D:
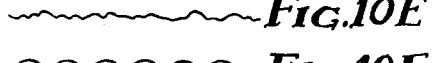
Figure 10E:
Figure 10G:
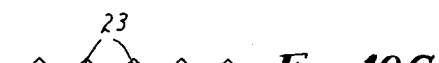
Figure 10H:
Figure 10I:

In FIGS. 10A–10I, various illustrative profiles of replicated microstructure-bearing surfaces are shown. The profile of FIG. 10A is plano, free of utilitarian discontinuities, and is illustrative of the microstructure of an ophthalmic lens or optical flat. The profiles of FIGS. 10B and 10C have spaced-apart utilitarian discontinuities which in FIG. 10B are in the form of projection or raised areas 21 and in FIG. 10C are in the form of depressions or indentations 22, such profiles being illustrative, for example, of microstructure present on video discs. FIGS. 10D and 10E depict profiles with a plurality of contiguous, utilitarian discontinuities, such profiles being illustrative, for example, of species of anti-reflective surfaces. FIG. 10F depicts a profile with a plurality of closely spaced arcs, e.g., hemispherical, and is illustrative of microstructure in the form of utilitarian lenslets, e.g., a replicated beaded layer which can be vapor coated with specular light reflecting material to provide a retroreflective sheet. FIG. 10G depicts a profile with individual contiguous utilitarian discontinuities in the form of projections 23 of like size and shape, and is illustrative of cube-corner retroreflective microstructure made up of trihedral prism elements. FIG. 10H depicts a profile with utilitarian discontinuities in the form of alternating steps 24 and lands 25, such a profile being illustrative of a linear Fresnel lens. And FIG. 10I depicts a profile which is a combination of the types illustrated in FIGS. 10C and 10H, the lands 26 being "rough" due to low order utilitarian discontinuities, such a profile being illustrative of a linear Fresnel lens with antireflective microstructure.

Figure 1:
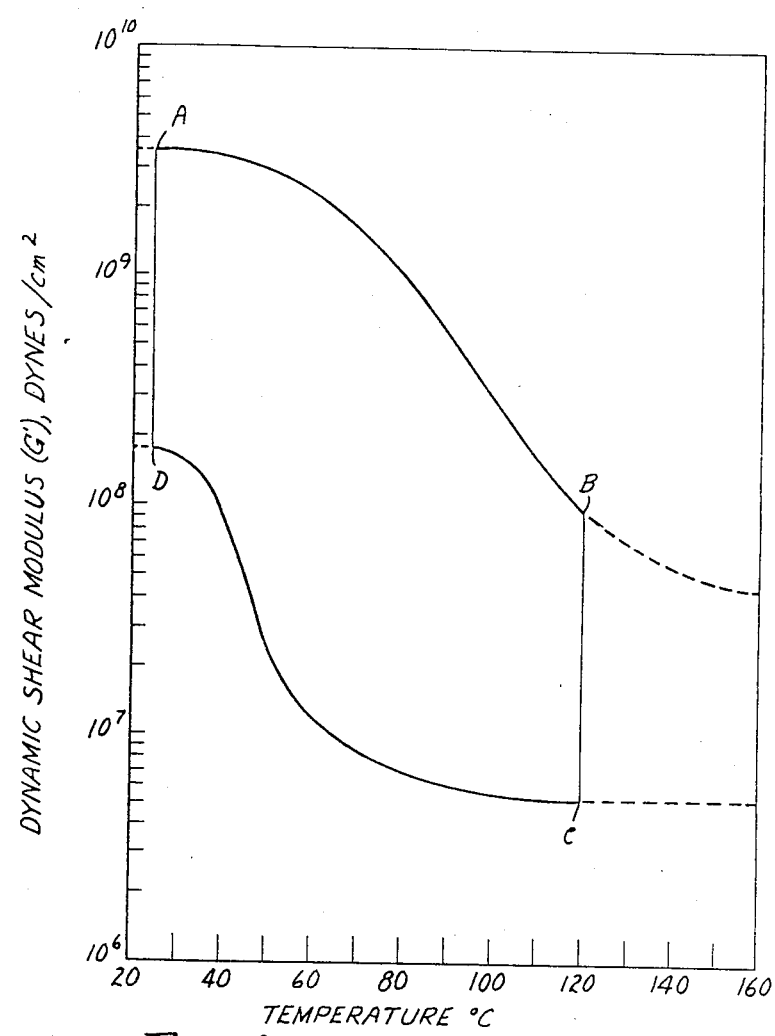
FIG. 1 is a plot of the dynamic sheer moduli of illustrative plastics used in making plastic articles of this invention.

Radiation addition-polymerizable, crosslinkable oligomeric compositions useful in making said shaped articles of this invention comprise radiation addition-polymerizable, oligomers or prepolymers having (1) one or more like or different "hard" (rigid) segments ("H"), viz., mono- or poly- and preferably di-valent moieties containing one or more carbocyclic and/or heterocyclic groups and preferably difunctional linking groups with hydrogen-bonding capabilities, e.g., carbonyldioxy, —OC(O)O—, carbamato, —NHC(O)O—, ureylene, —NHCONH—, amido, —NHCO—, and oxy, —O—, said moieties, when their valences are satisfied by protons, having at least one major transition temperature above 250° K., preferably above 350° K., said transition being a glass transition temperature or crystalline melting point, such as are usually detected by differential thermal analysis or thermomechanical analysis, (2) one or more like or different "soft" (flexible) segments ("S"), viz., poly-valent polysiloxane moieties which have a number average molecular weight in the range of about 500 to 5000 and each of which in the form of homopolymer has a glass transition temperature below 250° K., and (3) one or more like or different monovalent moieties ("E") containing a radiation sensitive, addition-polymerizable, functional group such as acrylyl, methacrylyl, allyl or vic-epoxy group. The amounts of "H", "S" and "E" segments or moieties in said oligomeric composition are such that the radiation-cured crosslinked plastic derived therefrom preferably has dynamic shear moduli, over the temperature range of 23° to 123° C., on or within the boundary of area A-B-C-D of FIG. 1. Where the oligomers contain two or more "H" segments, such segments can be the same or different, as is true of the "S" segments and the "E" moieties. Further, the oligomers are free of labile groups, viz., —O—O— and —N=N—, and generally will have a number average molecular weight of about 1000 to 30,000 grams per mole.

A class of such oligomers can be represented by the general formula

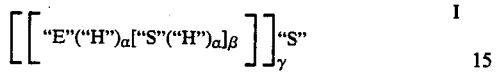  I where "E", "H", and "S" are as broadly defined above, $\alpha$ is 1 or 2, $\beta$ is zero or an integer up to 20 whose average is less than about 5, and $\gamma$ is 2 or 3.

"E" in formula I can be represented by the formula

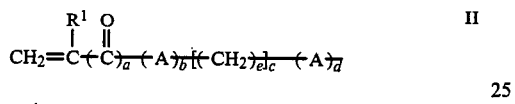  II where $R^1$ is a hydrogen atom or methyl,
each A is independently —NH— or —O—,
a, b, c and d are each independently zero or 1, with the provisos that
(1) at least one of b and d must be 1,
(2) if b and c are both zero, then a and d must be 1,
(3) if b and d are both 1, then a and c must be 1, and e is at least 2, and
(4) if d is 1 and a and b are both zero, then c must be 1,
e is an integer of 1 to 5,
subgenera of formula II being those of the formulas:

  IIA where preferably $R^1$ is methyl and A is —O—,

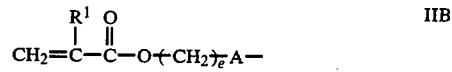  IIB where preferably $R^1$ is methyl, A is —O—, and e is 2, and

  IIC where preferably $R^1$ is a hydrogen atom and A is —O—.

"E" in formula I can also be that represented by the formulas:

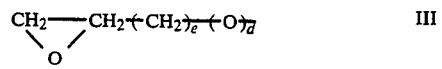  III

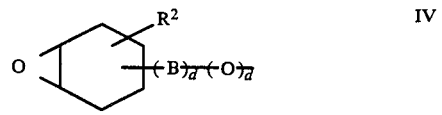  IV where (in formulas III and IV)
$R^2$ is hydrogen or a lower alkyl (e.g., with 1 to 4 carbon atoms and preferably is methyl),
B is $$-(CH_2)_f-, -CO-, -(CH_2)_e-CO- \text{ or}$$
$$-(CH_2)_f-OC(O)-(CH_2)_f-C(O)O(CH_2)_f-,$$

and each f is an integer of 2 to 5 each d is independently zero or 1, and e is 1 to 5.

"H" in formula I can be represented by the formulas:

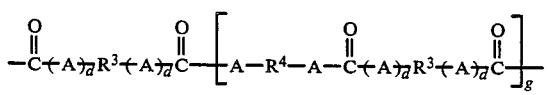  V

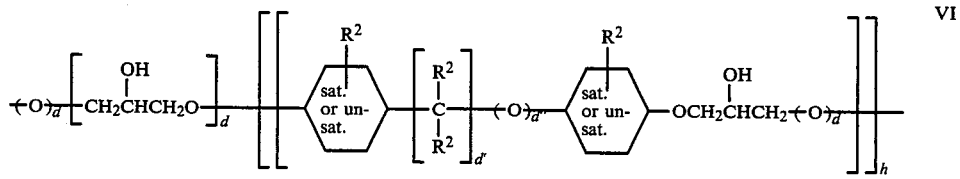  VI

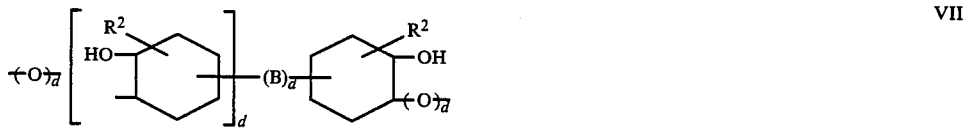  VII and

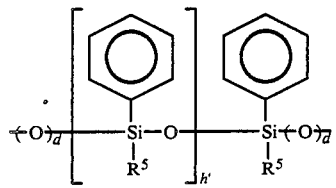

or, where "E" in formula I is selected from the group of structures represented by formulas IIA, IIB, and IIC, "H" can be represented by the following structure:

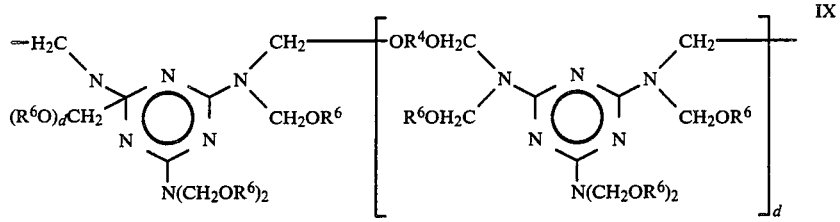

where (in formulas V, VI, VII, VIII and IX),
- each $R^2$ is independently as defined above for formula IV,
- each $R^3$ is independently a di-valent carbocyclic-containing radical derived from benzene, naphthalene, cyclohexane, dicyclohexylmethane, diphenylmethane, or norbornene, and their lower alkyl-substituted derivatives, by removal of two of their hydrogen atoms,
- each $R^4$ is independently an alkylene moiety with 2 to 10 (and preferably 2, 4 or 6) carbon atoms, or a cycloalkylene moiety with 6 to 10 carbon atoms (and preferably 8 carbon atoms, 6 of which are ring-carbon atoms),
- each $R^5$ is independently a phenyl moiety or (preferably) methyl
- each $R^6$ is independently a lower alkyl with 1 to 4 carbon atoms, preferably methyl,
- g is zero or a number up to 5 (and preferably an average of 1 to 3),
- B is as defined in formula IV,
- h is an integer of 1 to 10,
- h' is zero or an integer of 1 to 10, each d, d' and d" is independently zero or 1, with the proviso that if either one of d' or d" is 1, then the other is zero, and
- A is as defined above for formula II.

"S" in formula I is a polysiloxane residue remaining after removal of the active hydrogen atoms of polyols (illustrated by the generic formula $R_s(OH)_y$ hereinafter) such as polysiloxane polyols, or polysiloxane polyamines (illustrated by the generic formula $R_s(NH_2)_y$ hereinafter).

"S" in formula I can be a said polysiloxane residue represented by the formulas:

where b' is a number of 6 to 35, and R is a linear or branched alkylene group having 1 to 12 carbon atoms or a polyoxyalkylene group having 4 to 80 carbon atoms and 1 to 40 oxygen atoms, and

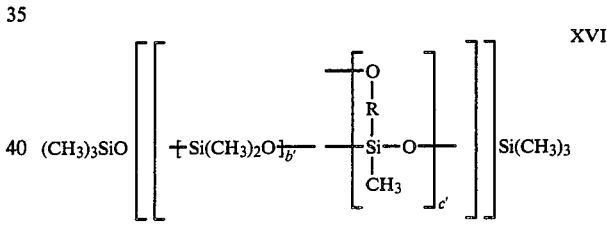

where the groups enclosed by the single brackets with subscripts b' and c' are repeating units randomly distributed within the double bracket, b' being a number of 6 to 35 and c' being 2 or 3, and R is as defined above for formula XV.

Representative species of oligomers useful in making the shaped articles of this invention and falling within the scope of formula I include those having the structures represented in Table I.

TABLE I

| Formula No. | "E" | "H" | "S" |
|---|---|---|---|
| XXI | $CH_2=C(CH_3)COOC_2H_4O-$ | $-CONH-$[trimethylcyclohexyl]$-CH_2NHCO-$ | $(CH_3)_3Si-O+Si(CH_3)_2-O\underset{av.}{]_{27}}[-Si(CH_3)(CH_2CH_2O-)-O]_{3\,av.}Si(CH_3)_3$ |
| XXII | " | $-CONH-$[trimethylcyclohexyl]$-CH_2NHCO-$ and diphenylsiloxane | $[[-OC_2H_4-Si(CH_3)_2-O+Si(CH_3)_2-O\underset{av.}{]_{14}}]_2 Si(CH_3)_2$ |
| XXIV | " | $[-CONH-$[trimethylcyclohexyl]$-CH_2NHCONH-C_6H_{12}]_2$ | $[[-O-C_2H_4-Si(CH_3)_2+O-Si(CH_3)_2\underset{av.}{]_{14}}-O-]_2 Si(CH_3)_2$ |
| XXVII | " | $-OC(=O)-C_6H_4-C(CH_3)_2-C_6H_4-O-C(=O)-$ | $[[-O-Si(CH_3)_2+O-Si(CH_3)_2\underset{av.}{]_{14}}-O-]_2 Si(CH_3)_2$ |
| XXXII | " | $-NHCO-$[cyclohexyl]$-CH_2-$[cyclohexyl]$-CONH-$ | $-OC_2H_4Si(CH_3)_2O+Si(CH_3)_2O\underset{av.}{]_{29}}Si(CH_3)_2-C_2H_4O-$ and |

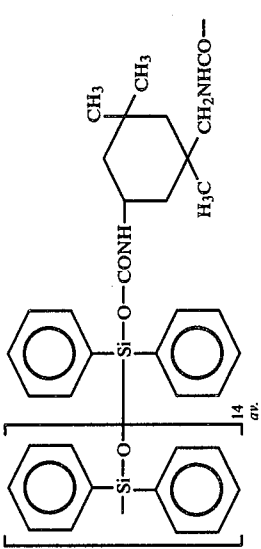

Another class of oligomers useful in making the shaped articles of this invention can be represented by the general formula:

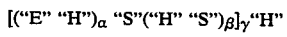     LV where "E", "H", "S", α, β and γ are as defined for formula I.

Since representative species of formula LV can be made with the same "E", "H" and "S" moieties as those species of formula I listed in TABLE I (though the number and ratio of such moieties in the species of formula LV can be different than the number and ratio of such moieties in the species of TABLE I), we will omit, in the interest of brevity, a similar list of representative species of formula LV.

Other classes of oligomers useful in making the shaped articles of this invention can be represented by the general formulas:

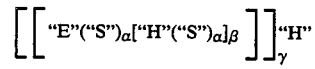     LVI and 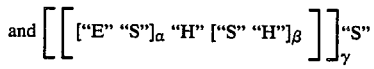     LVII where "H", "S", α, β and γ are as defined for formula I, but "E" in formulas LVI and VLII is represented by the formulas:

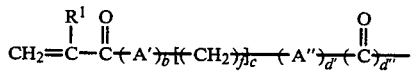     LVIII where R¹ is hydrogen or methyl,
each A' and A" is independently —NH— or —O—,
f is an integer of 2 to 5, and
each of b, c, d' and d" are independently zero or 1, with the provisos that (1) if b and c are both zero then d' and d" are both zero (in which case R¹ is preferably hydrogen), or (2) if b and c are both 1, then d' and d" are both zero (in which case preferably R¹ is hydrogen, A' is —O—, and f is 2 or 3) or are both 1 (in which case preferably R¹ is methyl and f is 2),

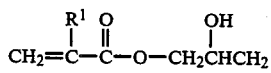     LIX where R¹ is hydrogen, or preferably, methyl, and

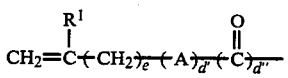     LX where R¹ is methyl or, preferably, hydrogen,
A is —NH— or, preferably, —O—,
e is an integer of 1 to 5, preferably 1, and
d' and d" are either both zero (in which case R¹ is preferably hydrogen and e is 1) or both are 1, (in which case preferably R¹ is hydrogen, A is —NH— and e is 1).

Representative species of oligomers of formula LVI useful in making the shaped articles of this invention are set forth in TABLE II, where structural formulas for the various "E", "H" and "S" moieties of said species have been omitted in the interest of brevity, reference instead being made to structural formulas for said moieties which are set out hereinbefore. Representative species of oligomers of formula LVII can be made with the same "E", "H", and "S" moieties as those species of formula LVI listed in Table II (though the number and ratio of such moieties in the species of formula LVII can be different than the number and ratio of such moieties in the species of TABLE II); thus, we will omit, in the interest of brevity, a similar list of representative species of formula LVII.

TABLE II

| Formula No. | "E" | "S" | "H" |
|---|---|---|---|
| LXIV | formula LVIII where b, c, d' and d" are 1 and f is 2, R¹ is —CH₃, A' is —O— and A" is —NH— | XXI | XXVIII* |
| LXV | formula LVIII where b, c, d' and d" are 1 and f is 2, R¹ is —CH₃, A' is —O— and A" is —NH— | XXII | XXXVI** |
| LXVII | formula LVIII where b, c, d' and d" are 1 and f is 2, R¹ is —CH₃, A' is —O— and A" is —NH— | XXII | XXVIII* |
| LXXII | formula LIX where R¹ is —CH₃ | XXII | XXI |
| LXXV | formula LIX where R¹ is —CH₃ | XXI | XXXVI** |
| LXXVIII | formula LX where R¹ is H, A is —NH—, and d', d" and e are 1 | XXII | XXXVI** |
| LXXIX | formula LX where R¹ is H, A is —NH—, and d', d" and e are 1 | XXII | L*** and XXI |

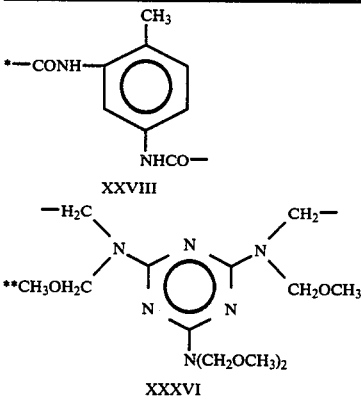

XXVIII

XXXVI

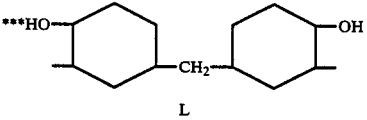

L

The radiation addition-polymerizable, crosslinkable oligomeric compositions useful in making the shaped articles of this invention can be prepared by general reactions that are well-known in the art of preparing addition polymerizable materials. Those general reactions are typically of two types: (1) addition reactions, viz., the urethane- or urea-forming reaction between an active hydrogen organic compound and isocyanate or the ether-forming reaction between an active hydrogen organic compound and an epoxy compound, and (2) condensation reactions, viz., esterification or etherification of an active hydrogen organic compound with a carboxylic acid or ester or acylhalide derivative thereof or with an alkyl ether, accompanied by elimination of a byproduct; for the preparation of some oligomeric compositions, both types of reactions will be employed as shown hereinafter. Such reactions are commonly used in synthetic polymer chemistry, e.g. see Saunders, J. H. and K. C. Frisch, "Polyurethanes: Chemistry and Technology", Part 1 (1962), especially Chapter III; Lee, H. and K. Neville, "Handbook of Epoxy Resins" (1967), especially Appendix 5-1; Bruins, P. F., "Epoxy Resin Technology" (1968), especially Chapters 1 and 2; Kirk-Othmer "Encyclopedia of Chemical Technology" 2nd Ed., Vol. 8, p. 313 (1965); Roberts, J. D. and M. C. Caserio, "Basic Principals of Organic Chemistry", p. 518 (1964). These general reactions are thus used to chemically combine "E" moieties with the "H" and "S" segments to form oligomeric compositions of use in the invention. Generally, the combining of the "E", "H" and "S" moieties is carried out in a sequence of steps; however, under some circumstances, it is convenient to carry out the reactions simultaneously and even to form the oligomeric composition in situ during the process of making the replicated plastic articles of this invention, e.g., carrying out the ether-forming addition reaction in situ in the replication mold.

Generally, the urethane- or urea-forming reactions are carried out at temperatures from 25° to 100° C. for 10 minutes to several hours or more, sufficient to bring about the reaction. Preferably, a catalyst such as dibutyltin dilaurate is used to promote the reaction. Generalized equations for such reactions in preparing the oligomeric composition used in this invention are illustrated as follows where the precursors of "H", "S" and "E" are denoted by formulas containing such letters as subscripts, the formula containing C as a subscript being a chain extending compound, and g, β and γ are as defined for formula I:

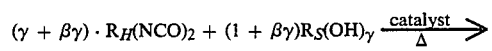

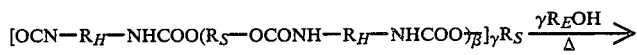

(2)

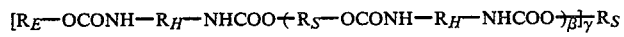

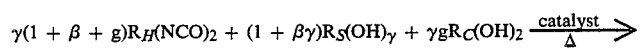

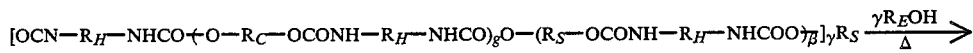

(3)

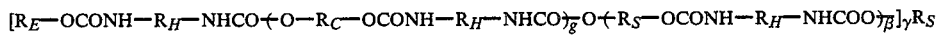

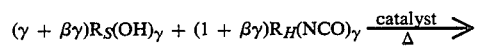

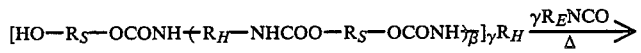

(4)

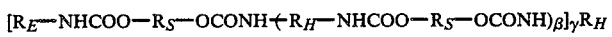

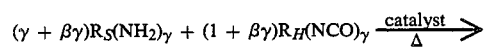

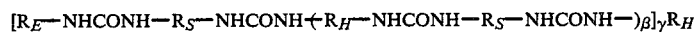

The ether-forming addition reactions are carried out generally at temperatures of 75° to 150° C. (or ambient temperatures when carried out in situ in the replication of the plastic articles), preferably in the presence of catalysts such as Lewis acids, e.g., $BF_3 \cdot O(C_2H_5)_2$, or Lewis bases, e.g., benzyltrimethylammonium hydroxide, or photoactive catalysts, such as the aryl iodonium or sulfonium salts described in U.S. Pat. No. 4,081,276, when the reaction is carried out in situ. Generalized equations for such reactions in preparing the oligomer composition are illustrated as follows:

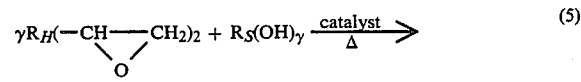

(5)

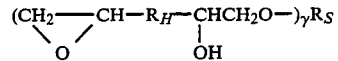

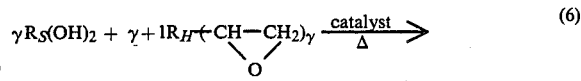

(6)

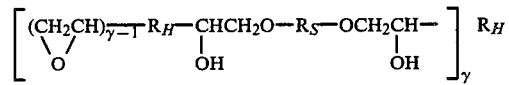

Representative ether-forming condensation reactions are those between "E" and "S" precursors having active hydrogens with an N-(lower alkoxymethyl) melamine as an "H" precursor, as illustrated by the following equations:

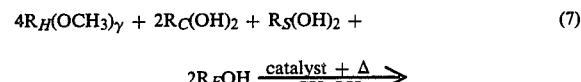

(7)

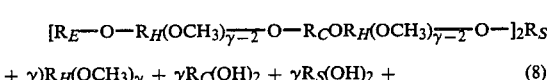

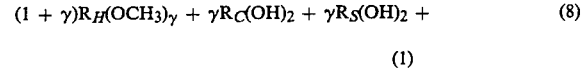

(8)

(1)

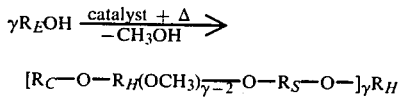

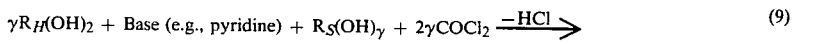

The reactions are promoted with acid catalyst such as p-toluene-sulfonic acid. Generally, temperatures from 60° to 120° C. for one to three hours or more can be used. The use of reduced pressures to remove volatile lower alkanol is also desirable.

Esterification reactions are illustrated by the following equations:

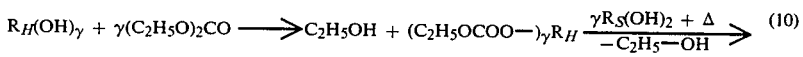 (9)

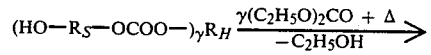

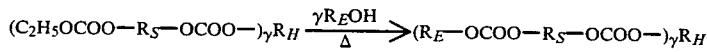

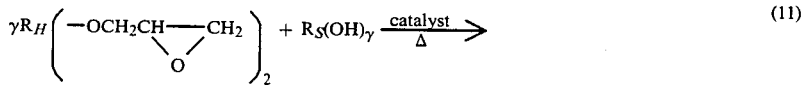 (10)

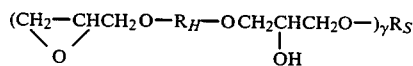

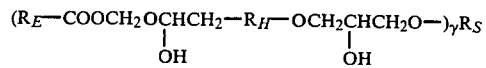

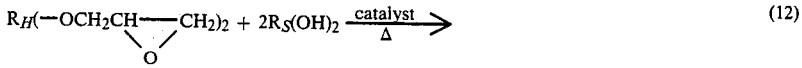 (11)

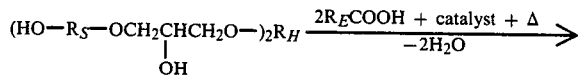

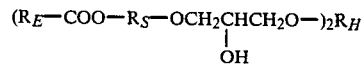

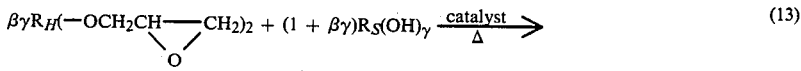 (12)

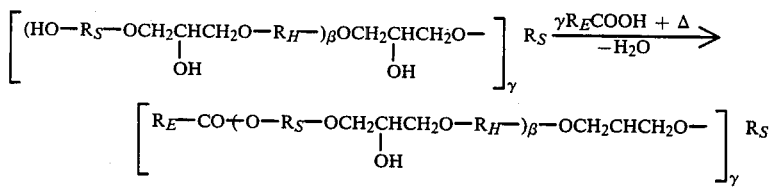

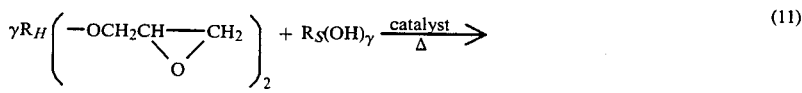 (13)

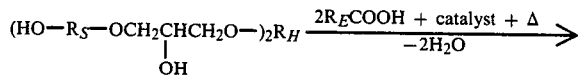

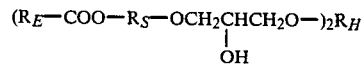

Such esterification reactions require the elimination of a byproduct (water, hydrogen halide, or lower alcohol). Esterifications are promoted by heating the mixture at 50° C. to 150° C. in the presence of a suitable catalyst, e.g., toluenesulfonic acid. The use of reduced pressures to remove volatile byproduct is also desirable.

Physical properties, e.g., thermal dimensional stability, of the crosslinked polymer resulting upon curing of said oligomeric composition will be dependent on the crosslink density of the polymer. An indication of that crosslink density can be derived by calculating the molecular weight per crosslink based on the monomeric precursor components of the oligomeric composition. That calculation, for example, in the case of Example 1, infra, is made by subtracting the gram moles of the "S" precursor from the gram moles of the "H" precursor, and dividing the difference into the total weight in grams of the monomeric precursor components in the oligomeric composition, the so-calculated molecular weight per crosslink being 1241. Generally, the calculated molecular weight per crosslink for the polymers will be in the range of 400 to 5000, preferably 1000 to 3000 the actual value generally being somewhat higher because of side reactions, incomplete reactions, etc.

The oligomeric products resulting from the above-illustrated equations (1) to (13) have predominantly the structures shown. The oligomeric product of equations (1), (2), (5), (7), (9), and (11), are encompassed by generic formula I; those of equations (3), (4), (10), and (12) by formula LVI; those of equations (6) and (8) by formula LV; and that of equation (13) by formula LVII. For example, in the oligomeric product of equation (1), $R_EO—$, $—CONH—R_H—NHCO—$, and $—O—R_S—O—$ correspond respectively to "E", "H", and "S" of formula I where $\alpha$ is 1. And in the oligomeric product of equation (2), which also falls within the scope of formula I where $\alpha$ is also 1, $R_EO—$ corresponds to "E", $—CONH—R_H—NHCO—$$+O—R_COCONH—R_H—NHCO—$$+_g$ corresponds to the "H" bonded to "E", the $—CONH—R_H—NHCO—$ moiety bonded to $—OR_SO—$ corresponds to the "H" bonded to "S", and $—OR_SO—$ corresponds to "S".

The oligomer products produced by these reactions often will be highly viscous and thus difficult to cast in the replication mold, and in addition may not be capable of producing the necessary crosslink density in the subsequently cured plastic article. Thus, it may be necessary to add to the oligomer product a radiation addition-polymerizable mono- or polyfunctional diluent monomer, e.g., 2-(N-butylcarbamyl) ethylmethacrylate, to lower the viscosity of the casting oligomeric composition and ensure the necessary crosslink density in the plastic article made therefrom, that crosslink density being manifested in a gel swell (determined in tetrahydrofuran, as hereinafter described) within the range of 35 to 200 wt. %, preferably 80 to 150 wt. %. Generally the amount of diluent monomer used should be less than 50 wt. % of the oligomeric composition (viz., oligomers plus diluent monomer), since greater amounts will reduce the concentration of the "H" and "S" segments below that required to provide the desired replicated plastic articles of this invention and will further increase the shrinkage during curing.

The oligomeric compositions (including the diluent monomer where used) and the articles made therefrom have the same amount of "H" segments and the same amount of "S" segments (and consequently the same ratio of these moieties). Said amount of "H" generally will be an amount in the range of 10 to 80 wt. % (of which amount at least 30 wt. % is due to the carbocyclic and heterocyclic groups), "H" preferably being 15 to 60 wt. %, and said amount of "S" will be an amount in the range of 10 to 60 wt. %, preferably 15 to 45 wt. %, the balance in the oligomeric composition being that attributable to the functional moieties "E" and the diluent monomer from which linking segments or moieties are derived as the balance of the plastic articles. Those plastic articles preferably have moduli over the temperature range of 23° to 120° C. which fall on or within the boundary A-B-C-D of FIG. 1, which property is measured by the procedure described in U.S. Pat. No. 3,853,595 where it is referred to as "storage shear modulus, G'". The particular amounts of "H", "S" and "E" in the oligomeric composition are such that the crosslinked polymer derived therefrom preferably has such moduli. Said moduli are dependent on the "H" and "S" contents and the crosslink density of the plastic, said crosslink density being manifested in gel swell as mentioned above. If a particular oligomer composition has "H", "S" and "E" contents falling within their said ranges and yet the crosslinked polymer derived thereform has a dynamic shear moduli curve which falls in whole or in part above the line A-B of FIG. 1, indicative of a plastic which may be too rigid for a particular article of this invention, the "H" content of the oligomeric composition will have to be lowered, e.g., by employing a higher molecular weight "S" precursor or by eliminating or decreasing the amount of chain extender in the preparation of the oligomeric composition, or the crosslink density will have to be lowered by using a higher molecular weight "H" precursor or higher molecular weight "S" precursor. On the other hand, if the dynamic shear moduli falls in whole or part below the line D-C of FIG. 1, indicative of a plastic which may be too flexible for a particular article of this invention, the "H" content of the oligomeric composition will have to be increased, e.g., by using a lower molecular weight "S" precursor and/or employing a chain extender together with additional "H" precursor, or the crosslink density will have to be increased by using a lower molecular wt. "H" precursor or "S" precursor or by employing a multifunctional diluent monomer, e.g., 1,6-hexanediol diacrylate. The proper particular amounts of "H" and "S" and crosslink density for a particular system necessary to provide the preferred dynamic shear moduli defined by A-B-C-D of FIG. 1 can be readily arrived at empirically by varying the above parameters as discussed above. These adjustments of dynamic moduli are based on the generally linear relationship, on a logarithmic basis, between dynamic modulus (or tensile strength) and the amount of "H" in the cured plastic.

The materials which can be used as "H", "S" and "E" precursors in making the oligomeric compositions used in this invention, as well as chain extending agents and catalysts used in their preparation and diluent monomers and radiation or photo sensitizers and initiators incorporated therein, are known materials, many of which are commercially available. An illustrative description of those materials follows below, reference being made to patents and the literature for purposes of brevity.

Polysiloxane polyols useful as "S" precursors include hydroxy-terminated diorgano-polysiloxanes in U.S. Pat. Nos. 4,098,742 and 3,886,865, and the siloxanes having a reactive hydroxyl group bonded to at least 2 of its silicon atoms, described in U.S. Pat. Nos. 3,577,264, 3,976,676, and 4,013,698.

Particularly useful, commercially available "S" precursors are silicone polycarbinols sold under the trademark "DOW CORNING", such as Q4-3667.

Polyisocyanates, especially diisocyanates, which can be used as "H" precursors, include those described in U.S. Pat. Nos. 3,641,199; 3,700,643; 3,819,586; 3,878,036; 3,931,117; 3,960,572; and 4,065,587. Epoxides which can be used as "H" precursors include diglycidyl ethers of bisphenol A, diglycidyl isophthalate, diglycidyl phthalate, o-glycidyl phenyl glycidyl ether, diglycidyl ethers of resorcinol, triglycidyl ethers of phloroglycinol, triglycidyl ethers of methyl phloroglycinol, diglycidyl phenyl ether and diglycidyl ether of hydrogenated bisphenol A, all of which are described in Appendix 4-1 of "Handbook of Epoxy Resins", by H. Lee and K. Neville, McGraw-Hill Book Company (1967).

Particularly useful commercially available diisocyanates which can be used as "H" precursors include isophorone diisocyanate sold under the trademark "IPDI" by Veba-Chemie AG and methylene bis(4-cyclohexylisocyanate) sold under the trademark "Hylene" WS by Dupont.

"E" precursors which can be used include the acrylyl compounds described in U.S. Pat. No. 3,700,643, the hydroxy acrylates and methacrylates described in U.S. Pat. No. 3,577,262 the ethylenically-unsaturated alcohols described in U.S. Pat. No. 3,297,745, the hydroxyalkylacrylates and methacrylates described in U.S. Pat. No., 4,065,587, the ethylenically unsaturated alcohols described in U.S. Pat. No., 3,960,572 and the following epoxides: butyl glycidyl ether, diglycidyl ether of propylene glycol, diglycidyl ether of butanediol, vinylcycohexene dioxide, mixed isomers of bis(2,3-epoxycyclopentyl)ether, bis(3,4-epoxy-6-methylcyclohexylmethyl) adipate, bis(3,4-epoxycyclopentyl)ether, 3,4-epoxy-6-methylcyclohexane carboxylate, para-butylphenol glycidyl ether, limonene dioxide, dicyclopentadiene dioxide and 3,4 epoxy-t-methylcyclohexylmethyl-4-epoxy-6-methylcyclohexane carboxylate, all of which epoxides are described by Lee and Nevill, supra.

Chain extenders which can be used in preparing the oligomers used in this invention include the known hydroxy-, carboxy-, amino or mercapto-terminated compounds useful for that purpose (see U.S. Pat. No., 3,448,171.)

To promote oligomer-forming reactions, it is generally desirable to utilize a catalyst. Typical examples of such catalysts include compounds containing tertiary amino groups, tin compounds and titanium compounds.

Examples of the preferred tin compounds are dibutyltin dilaurate, dibutylin diethylhexoate, dibutyltin sulfide, dibutyltin dibutoxide, stannous octoate, stannous oleate and stannous chloride. Concentrations of catalyst from about 0.01 to about 0.5 percent and preferably about 0.025 to 0.1 percent by weight of the total weight of reactants (exclusive of solvents) can be used.

The diluting monomers are addition-polymerizable monomers, viz., ethylenically unsaturated monomers and vicepoxy reactive diluents. The diluting monomers contribute to the "H", "S" or "E" content of the oligomeric composition depending on the glass transition temperature, $T_g$, of a homopolymer of the particular monomer. If the $T_g$ of its homopolymer is above about 350° K., the monomer contributes to the "H" content, below about 250° K. to the "S" content, and between about 250° K. and 350° C. to the "E" content. The concept of "hard" and "soft" monomers is well known (e.g., U.S. Pat. Nos. 4,077,926 and 4,077,932) and has been used to described monomers to be optionally used in adhesive compositions.

Suitable ethylenically unsaturated diluting monomers and the glass transition temperature of their homopolymers are well known in polymer chemistry literature, e.g., Brandrup and Immergut, Polymer Handbook, III-61 to 73, Interscience Publishers (1967). Examples of the "hard" monomers (and the $T_g$ of their homopolymers) are isobornyl acrylate (367° K.), methyl methacrylate (378° K.), cyclohexyl chloroacrylate (372° K.), 2-chlorostyrene (392° K.), 2,4-dichlorostyrene (406° K.), styrene (373° K.), acrylic acid (360° K.) acrylamide, acrylonitile (393° K.) and methacrylonitrile (393° K.). Examples of the "soft" monomers(and the $T_g$ of their homopolymers) are butyl acrylate (218° K.), ethyl acrylate (249° K.), 2-ethylhexyl acrylate (223° K.), dodecyl methacrylate (208° K.), and 4-decylstyrene (208° K.). Examples of diluting monomers which contribute to neither the "hard" content nor to the "soft" content but become incorporated into the linking segments (and the $T_g$ of their homopolymers) are 4-cyclohexyl-1-butene (318° K.), 1-dodecene (267° K.), t-butyl acrylate (251° K.), cyclohexyl acrylate dodecyl acrylate (270° K.), isopropyl acrylate (270° K.), methyl acrylate (279° K.), butyl methacrylate (293° K.), 4-butoxystyrene (320° K.), 2-(N-butylcarbamyl)ethyl methacrylate (304° K.) and 2-(N-ethylcarbamyl)ethyl methacrylate. Polyethylenically unsaturated monomers also become incorporated into the linking segments and are used in small quantities to reduce the molecular weight of the cured oligomeric composition per crosslink. Typical of such compounds are 1,4-butylene dimethacrylate or acrylate, ethylene dimethacrylate or acrylate, trimethylolpropane di- or tri-acrylate, glyceryl diacrylate or methacrylate, glyceryl triacrylate or methacylate, glycidyl acrylate or methacrylate, pentaerythritol triacrylate or trimethacrylate, diallyl phthalate, 2,2-bis(4-methacryloxyphenyl)-propane, diallyl adipate di(2-acryloxyethyl)ether, dipentaerythritol pentaacrylate, neopentylglycol triacrylate, polypropylene glycol diacrylate or dimethacrylate, and 1,3,5-tri-(2-methacryloxyethyl)-s-triazine.

Diluting epoxy-reactive monomers include phenyl glycidyl ether, 4-vinylcyclohexene dioxide, limonene dioxide, 4-vinyl-cyclohexene oxide, 1,2-cyclohexene oxide, glycidyl acrylate, glycidyl methacrylate, and styrene oxide.

Suitable addition-polymerization catalysts for use in the oligomeric compositions wherein the addition-polymerizable group is an ethylenically unsaturated group as represented in formula II, viz., acrylic or olefinic, are catalysts which liberate or generate a free-radical on addition of energy. Such catalysts are well known and are described frequently in polymerization art, e.g., Chapter II of "Photochemistry" by Calvert and Pitts, John Wiley & Sons (1966). Included among free-radical catalysts are the conventional heat activated catalysts such as organic peroxides and organic hydroperoxides; examples are benzoyl peroxide, tertiary-butyl perbenzoate, cumene hydroperoxide, azobis (isobutyronitrile) and the like. The preferred catalysts are photopolymerization initiators which, when used in an addition-polymerizable group-containing composition, facilitate polymerization when the composition is irradiated. Included among such initiators are acyloin and derivatives thereof, such as benzoin, benzoin methyl ether, benzoin ethyl ether, benzoin isopropyl ether, benzoin isobutyl ether, and $\alpha$-methylbenzoin; diketones such as benzil and diacetyl, etc.; organic sulfides such as diphenyl monosulfide, diphenyl disulfide, decyl phenyl sulfide, and tetramethylthiuram monosulfide; S-acyl dithiocarbamates, such as S-benzoyl-N,N-dimethyldithiocarbamate; phenones such as acetophenone, $\alpha,\alpha,\alpha$-tribromacetophenone, $\alpha,\alpha$-diethoxyacetophenone, o-nitro-$\alpha,\alpha,\alpha$-tribromoacetophenone, benzophenone, and p,p'-tetramethyldiaminobenzophenone; sulfonyl halides such as p-toluenesulfonyl chloride, 1-naphthalenesulfonyl chloride, 2-naphthalenesulfonyl chloride, 1,3-benzenedisulfonyl chloride, 2,4-dinitrobenzenesulfonyl bromide and p-acetamidobenzenesulfonyl chloride. Normally, the initiator is used in amounts ranging from about 0.01 to 5% by weight of the total oligomeric composition. When the quantity is less than 0.01% by weight, the photopolymerization rate becomes extremely low. If the initiator is used in excess of 5% by weight, no correspondingly improved effect can be expected. Thus, addition of such greater quantity is economically unjustified. Preferably, about 0.25 to 1.0% of initiator is used in the oligomeric compositions.

For those oligomeric compositions in which the radiation sensitive addition-polymerizable, functional group-containing moiety is an epoxy group as represented in formulas III or IV, any catalyst can be used which liberates or generates a cationic polymerization catalyst upon exposure to radiation. These catalysts are onium salts that are well known in the art of polymerization, e.g., U.S. Pat. No. 3,826,650 in which it is taught that photosensitive latent curing agents classified as aromatic diazonium salts of a complex anion, e.g., hexafluoroantimonate, and the like are used for photopolymerizing epoxy monomers, and U.S. Pat. No. 4,081,276 in which it is taught that photoinitiators capable of releasing a cationic polymerization catalyst upon exposure to radiant energy are aromatic halonium, aromatic Group Va onium, and aromatic Group VIa onium salts of complex anions and are suitable for forming an image on a substrate. The preferred catalyst for polymerizing the oligomeric compositions of the invention in which the addition-polymerizable functional group-containing moiety is an epoxy group are aromatic iodonium or sulfonium salts of complex anions selected from tetrafluoroborate, hexafluorophosphate, hexachloroantimonate, and hexafluoroantimonate. Examples of such salts include diphenyliodonium hexafluorophosphate, diphenyliodonium hexafluoroantimonate, triphenylsulfonium hexafluorophosphate, and triphenyl hexafluoroantimonate. Other preferred aromatic onium salt photoinitiators are the aromatic iodonium and sulfonium salts of fluoroaliphatic sulfonic acid and the bis(fluoroaliphaticsulfonyl)methanes that are disclosed in U.S. Pat. No. 4,049,861.

In making a particular shaped plastic article of this invention for a specific application, economic considerations will influence what particular oligomeric composition or compositions and which mode of preparation thereof should be used for that purpose. For example, in making retroreflective cube corner sheeting for use as highway traffic control markers where such requirements as resistance to weathering and high impact strength are essential, urethane-containing oligomeric compositions preferably would be selected, such as those within the scope of formulas I or LV, the urethane linkage imparting stability to the sheeting upon its exposure to light, heat and moisture, and the mode selected for making such oligomeric composition advantageously being that of aforesaid equation (2) because, for example, it involves only two reaction steps and results in an oligomeric product with a relatively high content of "H" segments, necessary for satisfying the high impact strength requirement of the sheeting, and because equation (2) permits the use of hydroxyacrylates, such as 2-hydroxyethylmethacrylate, and cycloaliphatic polyisocyanates, such as isophorone diisocyanate, these types of reactants being commercially available raw materials which will augment that of the urethane linkage in providing the desired degree of weatherability.

As another example, in making flexible video discs, where high abrasion resistance and optical transparency are important, urethane-containing oligomeric composition preferably would be selected, such as those falling within the scope of formulas I or LV, the urethane linkage imparting abrasion resistance to the disc, and the mode selected for mkaing such oligomeric composition advantageously being that of aforesaid equation (1) because, for example, of its limited number of reactions and its amenability to use of reactants which are commercially available and which impart to the disc requisite flexibility, high optical transparency, and low haze; such reactants are cycloaliphatic polyisocyanates, such as isophorone diisocyanate, which also are commercially available and which also impart to the oligomeric composition the property of fast radiation curability.

As still another example, in making Fresnel lenses where high optical transparency is important for image projection and high focusing efficiency is important for solar heat concentration, urethane-containing or aromatic carbonate-containing oligomeric compositions preferably would be selected, such as those within the scope of formulas I or LV, the urethane linkage imparting stability to light and heat and the aromatic carbonate moiety imparting high refractive index and concomittant low chromatic aberration, and the mode selected for making said urethane-containing oligomeric compositions advantageously being that of equations (1) and (2) and the mode for making said carbonate-containing oligomeric compositions advantageously being the aforesaid equations (9) or (10), said equations (1), (2), (9) and (10) entailing a limited number of reactions and being amenable to use of commercially available materials as reactants for imparting the requisite properties to the plastic articles. In the case of projection lenses and solar collectors, said reactants can be isophorone diisocyanate, polycaprolactone polyols, and hydroxyacrylates.

The shaped plastic articles of this invention are typically prepared by pouring or filling a mold master with the oligomeric composition, exposing the resulting cast composition to actinic radiation to rapidly cure the same, and removing from said mold master the resulting shaped plastic article which comprises crosslinked plastic and has a surface bearing microstructure replicated from the mold master.

The particular mold master used in replication will depend on the type of shaped article to be made. For purposes of making optical lenses, e.g., ophthalmic lens blanks, having a surface with an optical finish, the mold master can be made of transparent (e.g., "Pyrex") glass, such masters being commercially available. For purposes of making diffraction gratings, e.g., spectral filters, light collectors, and decorating decals, the mold master can be made of metal with the diffraction pattern thereon made by mechanical ruling or holographically, such diffraction grating masters being commercially available, e.g., see the "Diffraction Grating Catalog" (1974), of PTR Optics Corp., Waltham, Mass., and Bulletins ACA 1004-1-1270 and ACA 1006-1-1-270 of Angenieux Corp. of America, Oceanside, N.Y.

For cube-corner sheeting, linear Fresnel lenses, and other shaped plastic articles having raised or indented microstructure-bearing surfaces, mold masters can be used which are made of plastic, e.g., acrylonitrile-butadienestyrene, or preferably (for mass production of such replicated articles) made of metal fabricated directly from a suitable metal by engraving, hobbing, assembling as a bundle a plurality of metal parts machined in the desired configuration, or other mechanical means or by electroforming, e.g., see "Encyclopedia of Polymer Science & Technology", Vol. 8, p. 651 (1968), and "Principles of Electroplating and Electroforming", W. Blum and G. B. Hogaboom, 3rd Ed. McGraw-Hill Co., Inc., Chap. VIII (1949), and U.S. Pat. No. 3,689,346.

Where the microstructure to be replicated can be initially formed by machining originals made of plastics which are difficult to wet, such as commercially available acrylic resins, e.g, that sold under the trademark "LUCITE", electroformed metal mold masters can be formed from such machined originals and used to make shaped plastic articles (such as the diffraction gratings, Fresnel lenses and retroreflective sheeting described in the working examples of this specification) by treating the machined plastic surface to render it wettable and sensitized (for example, by the treatment described in U.S. Pat. No. 3,666,527), rendering the surface conductive by simultaneous contact, using a two-nozzle spray gun, with an ammonical silver salt solution, and a reducing agent, such a formaldehyde or dextrose, plating or electroforming nickel on the silver-coated surface from a commercially available nickel bath, and separating the resulting metal layer from the plastic original, thus generating a metal master which can be used for replicating said shaped plastic articles or from which second and third generation electroformed nickel copies can be made as required to provide a tooling supply for replicating said shaped plastic articles. Where the microstructure to be replicated can not be initially machined on a plastic original for purposes of making masters used in replicating such articles as the video disc described hereinafter in a working example of this specification, mold masters fabricated by photoresist techniques can be used, e.g., see the journal articles in "Science", Vol. 196, No. 4293, p. 945 (1977), and "Optics and Laser Technology" August, 1977, p. 169.

The cast, curable oligomeric composition can be cured by exposure to actinic radiation, viz., ionizing or non-ionizing radiation, a curing technique well-known and widely-used in the art of radiation addition polymerization (e.g., see U.S. Pat. No. 3,700,643). Typically, ultraviolet radiation produced by such sources as mercury arcs, sunlamps, or xenon lamps, with UV radiation primarily in the regions of about 2000 to 4000A, will be most useful. Ionizing radiation produced by electron accelerators, e.g., continuous filament or swept beam accelerators, can be used, wherein the electrons are provided with the kinetic energy derived from acceleration through a field varying from 150 kilovolts up to as high as 4000 kilovolts. Useful radiation dosage required to complete the curing will vary, depending on the particular oligomeric composition used, its molecular weight and the crosslinking density desired; for ultraviolet radiation, a useful dosage will generally be in the range of 0.1 to 100 joules per square centimeter exposed and for ionizing radiation, such as electron beam, a useful dosage will be $5 \times 10^3$ rads to $10^7$ rads. Normally the exposure is carried out at or near room temperature and atmospheric pressure. An inert atmosphere, such as nitrogen or carbon dioxide gases, may be desired in curing some oligomeric compositions, viz., those relying on free-radical curing mechanisms, e.g., acrylate-, or methacrylate-terminated oligomers. Radiation processing equipment useful in the practice of this invention is commercially available, e.g., untraviolet lamp systems sold by Radiation Polymer Corp., Plainfield, Ill., and Fusion Systems Corp., Greenbelt, Md., and ionizing radiation systems sold by Energy Sciences, Inc., Burlington, Mass. and Radiation Dynamics, Inc., Long Island, N.Y. (Although the radiation used in curing the oligomeric composition has been described in detail herein as being actinic radiation, thermal radiation can be used, e.g., 50° to 150° C., for 5 min to several hours depending on the oligomeric composition and catalyst used; thermal radiation is not preferred because it is more time-consuming, requires more energy, and is not as controllable as actinic radiation).

Following radiation of the cast composition (actinic radiation effects complete curing in ½ to 5 seconds generally), the cured, shaped plastic article is readily separated or removed from the mold master. Mold release agents may be used, though generally they are not required. Depending on the particular shaped plastic article made and the nature of the mold master, the mold master can be repeatedly used for replication done on a continuous mass production basis.

Figure 2:
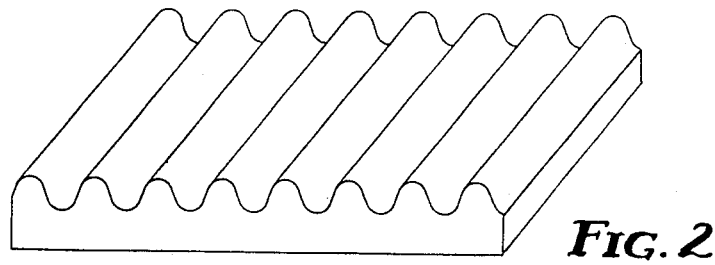
FIG. 2 is an isometric view of replicated diffraction gratings of this invention.

In selecting an oligomeric composition for use in preparing a particular shaped article, it has been found useful to prepare a transmissive diffraction grating test sample from the composition. Such sample can be used to measure replicating fidelity capability of the oligomeric composition and the thermal dimensional stability capability of the oligomeric composition. FIG. 2 schematically illustrates a replicated diffraction grating useful as a test sample, the preparation and testing of which is described hereinafter. The test measures the first order diffraction efficiency of both the master grating and replicated test sample, the efficiency of which is related to the depth of the grooves. A comparison of the efficiency of the replicated test sample to that of the master grating determines the fidelity of replications. Generally the oligomeric composition of this invention will give diffraction grating test samples having a replicated efficiency of at least 85% of that of the master grating. For some particular shaped articles, the replication efficiency must be significantly greater than 85% (for example, for replicated video discs, the replication efficiency must approach at least 99%) and for such articles an oligomeric composition must be selected which will produce a diffraction grating test sample having such replication efficiency. Replication efficiency will be dependent on the degree of shrinkage of the diffraction grating test sample; the greater the shrinkage, the lower the replication fidelity. Shrinkage in turn is dependent on the number of double bonds present in the oligomeric composition per unit weight thereof, and generally the greater such number of double bonds, the greater the degree of shrinkage. For acrylate- or methacrylate-terminated oligomers, the shrinkage will be about 20 cc/gram mole of double bonds, and this shrinkage factor can be used as a guide in selecting an oligomeric composition necessary to yield the desired replication efficiency.

Generally, the oligomeric compositions will yield diffraction grating test samples which have high thermal dimentional stability. For example, generally when said test samples are heated in air in a programmed manner from 23° to 170° C., the first order diffraction efficiency is practically constant over these temperatures. (By contrast, the first order diffraction efficiency of comparative diffraction grating test samples made of poly(methyl methacrylate), polyvinyl chloride, cellulose acetate butyrate, and polyethylene terephthalate dropped rapidly or precipitously to zero when the temperature reached about 70° to 115° C.). The change in first order diffraction efficiency of diffraction grating test samples of the oligomeric compositions of this invention upon heating at 130° C. in air for 1 hour is less than 15%, as compared to the first order diffraction efficiency before heating. Generally, the higher the weight ratio of "H" to "S" in the oligomeric composition, and the lower the molecular weight between crosslinks in the shaped article produced therefrom, the greater the thermal dimensional stability, i.e., the smaller the change in first order diffraction efficiency upon heating.

Some of the shaped articles of this invention will require higher thermal dimensional stability than others, viz., a change in first order diffraction efficiency on heating at 130° of less than 5%. For example, replicated cube-corner sheeting, the use of which exposes it to elevated temperatures, e.g., on a road sign heated by the sun in Arizona, will require a high thermal dimensional stability, whereas a replicated video disc, played at room temperature, will not require high thermal dimensional stability.

In addition to the preparation of diffraction grating test samples, it has been found useful to prepare cured, self-supporting film samples (with planar surfaces) of the oligomeric composition and measure the tensile strength, elastic modulus, elongation-to-break, and dynamic shear moduli of the film samples, the preparation and testing of which is described elsewhere herein. The values of these measurements will be factors to consider in selecting an oligomer composition for fabrication of a particular shaped plastic article therefrom. For example, a replicated video disc which may have to be relatively limp (or "floppy") for playing on a particular type of player, would be prepared from oligomeric compositions which yield test film samples having relatively low elastic modulus and dynamic shear moduli and relatively high elongation. In contrast, a rigid or stiff replicated Fresnel lens, used for projection of images, would be prepared from oligomeric compositions which yield test film samples having relatively high elastic modulus and dynamic shear moduli, and relatively low elongation. The test film samples can also be measured for optical properties as an aid in selection of an oligomeric composition for preparation of replicated shaped plastic articles used for optical purposes, e.g., where it is necessary to satisfy requirements of high transmission (i.e., at least 90%) and low haze (i.e., less than 5%, preferably less than 2%).

Figure 3:
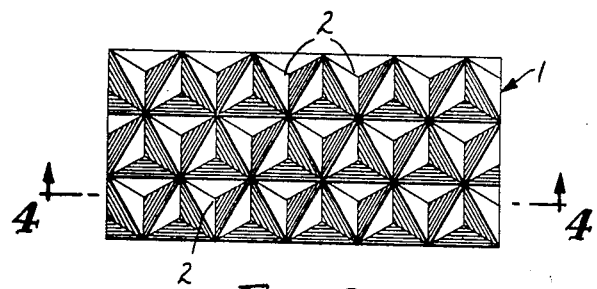
FIG. 3 is a plan view of replicated array of cube-corner retroreflective elements of this invention.
Figure 4:
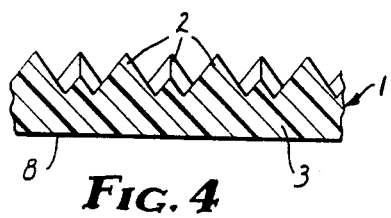
FIG. 4 is an elevation section of FIG. 3 taken along 4—4.

FIGS. 3 and 4 schematically illustrate a portion of a typical replicated cube-corner retroreflective sheet 1 made in accordance with this invention. The geometry or configuration of this type of article is described, for example, in U.S. Pat. No. 3,810,804. Reference 2 generally designates one of the minute cube corner elements or formations disposed in an array on one side of the sheeting 1. Each element 2 has the shape of a trihedral prism with three exposed planar faces, substantially perpendicular to one another, with the apex of the prism vertically aligned with the center of the base. The angle between the faces is the same for each cube-corner element in the array, and will be about 90°. Said angle can slightly deviate from 90° by design, i.e., the angle will be dependent upon the particular application of the sheeting, as is well-known. For example, in the United States, state governments generally specify maximum brightness of retroreflective traffic control markers at from 0.2° to 2° divergence (or observational) angles, thus dictating a specific angle between the faces of the cube-corner elements in the marker. The cube corner elements 2 in sheet 1 are all of the same dimensions and are aligned in an array or pattern of rows and columns, the bases being in the same plane, and adjacent elements being contiguous at the edges of their bases such that there is no spacing or flat areas between adjacent elements. The cube-corner elements 2 surmount a body portion 3, the lower surface of which is smooth or planar, the body portion being preferably integral with elements, the sheeting thus being monolithic. Generally, each cube-corner element 2 has a side edge dimension up to 0.025 inch (0.635 mm), preferably less than 0.010 inch (0.254 mm). The body portion 3 is sufficiently thick to render the sheeting self-supporting and tough so as to maintain the integrity of the array of cube-corner elements 2. Generally, the body portion will be 0.002 to 0.030 inch (0.05 to 0.075 mm), preferably 0.003 to 0.010 inch (0.075 to 0.25 mm).

In the application of such cube-corner sheeting as a highway traffic control marker, it will be desirable to seal air spaces between the faces of the cube-corner elements with a sealing film placed over the top of the elements, e.g., in the manner described in U.S. Pat. No. 4,025,159, and coat the exposed surface of the film with a pressure-sensitive adhesive composition which is dried and adhered to a rigid sheet, e.g., aluminum, which forms a base for the resulting marker. The exposed lower surface 8 of the body portion 3 of the cube-corner sheeting 1 may be first selectively coated with transparent ink layers to provide the desired traffic control message, e.g., "STOP", and then coated with a top coat to protect the message, e.g., against weathering.

Figure 5:
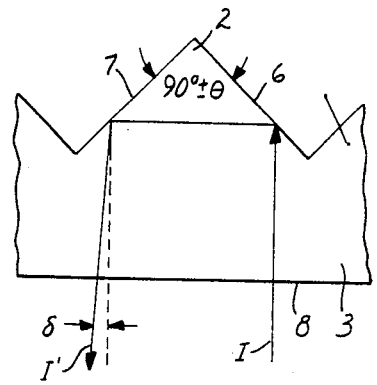
FIG. 5 is a diagrammatic view of a cube-corner element.

The principle of operation of retroreflective cube corner structures is well known, e.g., see J. Optical Society of America, Vol. 48, No. 7, July, 1958, p. 496. That principle is in essence illustrated by FIG. 5. Referring to that figure, in which a single cube corner element 2 is shown schematically with two of its faces 6, 7 being substantially perpendicular to one another, as shown by the angle $90° \pm \theta$, and the body portion 3 having an exposed lower surface 8. An incident ray of light I enters the element 2 upon striking surface 8 in a direction perpendicular thereto, passes through the body portion 3, strikes face 6, is reflected to the other faces, is reflected from the latter and passes out of the element as reflected ray I'. Perfect retroreflection of incident ray I for the particular element shown in FIG. 5 would result in the reflected ray passing out the element in a path, shown by the broken line, exactly parallel to the path of the incident ray. The deviation between the path of perfect reflection and the actual path, I', is shown by the divergence angle $\delta$, which will be 0.2° to 2° in the case where state governments specify the same as described above. In order to obtain and maintain the desired specified divergence angles, the desired dimensions and angles of the cube-corner elements must be obtained and maintained within very narrow limits. For example, as described by J. Optical Society of America, supra, for a plastic having an index of refraction of 1.5 (typical for the plastics comprising the shaped articles of this invention, said plastics generally having an index of 1.48 to 1.6), the divergence angle $\delta$ can be expressed by the equation $\delta = 4.9\,\theta$, and thus when $\delta$ is 0.2°, $\theta$ is 0.041° or 2.46 minutes of arc, which is an exceedingly small angle. If the angles between the faces of a replicated cube-corner element cannot be controlled and maintained, e.g., because of shrinkage, distortion upon removal from the mold, or of thermal distortion, the efficiency of retroreflection will be affected. Even a slight lack of control and maintenance of the angle can significantly adversely affect the efficiency. Rigid, high elastic modulus plastics, such as poly(methyl methacrylate), have thus been resorted to in the art, however, such plastics are brittle and have low heat distortion resistance. In contrast, the desired angles of the plastic cube corner elements made in accordance with this invention are controlled and maintained even at elevated temperatures, and the elements are flexible, articles with such elements being of wide application, e.g., where high impact strength is desired or required, as in the case of highway "STOP" signs.

Additionally, the retroreflective cube-corner sheeting of this invention can be made with initial high brightness capability, e.g., at least 600 candles/lumen at 0.2° divergence angle.

Figure 4A:
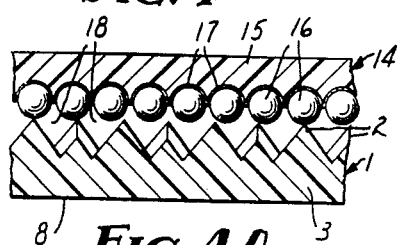
FIG. 4A is an elevation section of a modified retroreflective sheeting employing the array of FIG. 4.

FIG. 4A illustrates the combination of the replicated cube-corner retroreflective sheet 1 of FIGS. 3, 4 with a retroreflective beaded sheet 14, this type of construction being described in U.S. Pat. No, 4,025,159, as a combination cube-corner exposed-lens product of the general type described in U.S. Pat. No. 3,140,340. Sheet 14 comprises a layer 15 of binder material, a monolayer of transparent glass microspheres 16 partially embedded in the binder material, and specular reflective material 17 underlying and in optical connection with the embedded surface of the microspheres. The points of contact between the apices of cube-corner elements 2 and microspheres 16 can be bonded as shown in FIG. 4A and as taught in U.S. Pat. No. 4,025,159, forming hermetically sealed cells or pockets 18, or the sheets 1 and 14 can be spaced apart as taught in U.S. Pat. No. 3,140,340, forming an air gap which provides a prism-air interface. In this construction, light rays escaping from the cube-corner sheet 1 are reflected back from beaded sheet 14, thereby providing wide angularity and divergence of retroreflection.

Figure 6:
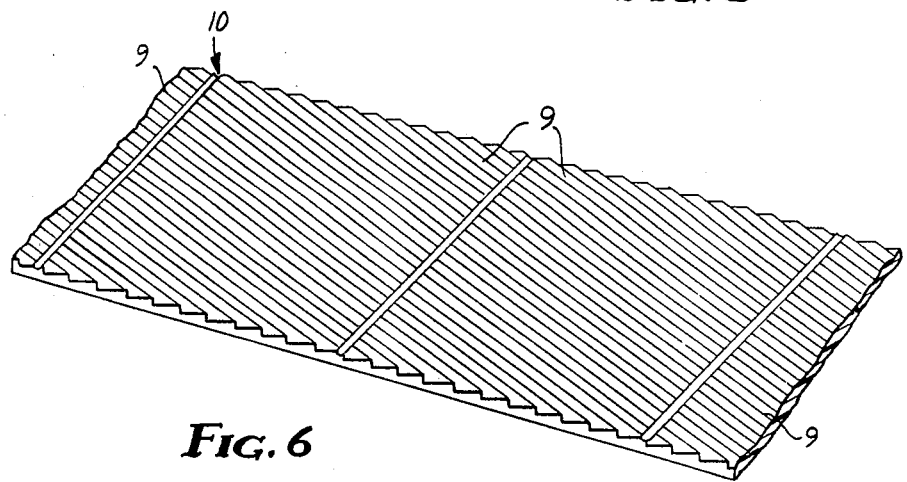
FIG. 6 is an isometric view of a sheet of replicated linear Fresnel lenses of this invention.

Other articles of this invention are echelon or Fresnel lenses, such as those with configurations described in U.S. Pat. Nos. 3,334,958, 3,972,593, 3,511,563, and 4,082,433, and used, for example, in overhead projectors. FIG. 6 illustrates a plurality of one type of such lens 9, viz., linear Fresnel lenses (fabricated in accordance with this invention, as shown herebelow) in the form of a continuous sheet 10 of contiguous replicated plastic lenses, which sheet can be cut to separate the individual lenses. The flexibility and dimensional stability of the Fresnel lens made in accordance with this invention makes them useful in a wide field of application, such as decorative mouldings, e.g., automobile moulding, described in U.S. Pat. No. 3,908,056.

As mentioned hereinbefore, replicated shaped plastic articles can be fabricated in accordance with this invention for purposes of information processing and transmission. FIGS. 7 and 8 illustrate an example of such articles, namely a video disc 11 (the fabrication of which is exemplified hereinafter) having spirally arranged tracks 12 each of which is made up of circumferentially-spaced, minute depressions or holes commonly called "micropits", with lengths, for example, about 1.2 $\mu$m, widths about 0.75 $\mu$m, and depths about 0.3 $\mu$m, and which are circumferentially spaced, for example 1.5 $\mu$m, the variations of said lengths and spacings depending on the frequency of the carrier signals which are recorded on the disc, articles of this type being described in Optics & Laser Technology, supra. (Alternatively, the information on the video disc can be in spiral grooves with the video information appearing on the bottom and wall regions of the grooves in the form of geometric or topographical variations, as described, for example, in U.S. Pat. Nos. 3,795,534 and 3,882,214.) The high replication fidelity capability of this invention is particularly well-suited to fabrication of the above-described replicated video discs.

Objects and advantages of this invention are illustrated in the following examples thereof. In these examples, the parts referred to are parts by weight and the percents referred to are percents by weight. In all runs in which the addition polymerizable oligomer products were synthesized, a dry air atmosphere was maintained during the course of reaction. The cured film test samples used for measuring physical properties were made by mixing 100 parts of the oligomer product (or oligomer product diluted with diluent monomer) with 0.5 part 2,2-diethoxyacetophenone photoinitiator, vacuum degassing the resulting mixture to remove entrapped air, and casting the mixture to a thickness of 250 microns (using a flat-bed knife coater) between two sheets of 125-micron thick polyethylene terephthalate polyester, thereby forming a "sandwich" assembly. Using a laboratory ultraviolet processor (viz., a "QC Processor", manufactured by Radiation Polymer Corp.), the "sandwich" assembly was passed six times on a moving belt conveyor moving at 15 m per minute under a bank of two medium pressure mercury vapor arc lamps operating at 80 watts/cm of length. The conveyor was spaced at a distance of 10 cm from the lamps. At the completion of the curing process, the cast mixture cured to a solid film of crosslinked polymer between the polyester sheets, which were then stripped from the polymer film and physical properties of the film were then tested.

The replicated diffraction grating test samples (used for measuring replicated fidelity and thermal dimensional stability) were made in the following examples by using a high frequency holographic metal mold diffraction grating master, having 867.7 line pairs per millimeter. This master was coated (by a flat-bed knife coater) with a 375-micron thick layer of the oligomer product (or oligomer product diluted with diluent monomer), to which 0.5 percent 2,2-diethoxyacetophenone had been added. A polyethylene terephthalate polyester film (125-micron thick) was placed as a cover sheet over the layer of curable oligomer material and the resulting construction was cured with said "QC Processor" by placing it on a conveyor moving at 15 meters per minute under two medium pressure mercury vapor lamps operating at 80 watts per cm of length. A distance between the lamps and the oligomer surface of 10 cm was maintained. After six passes under the lamps, polymerization of the oligomer product was complete. The polyester cover sheet was stripped off and the layer of polymerized product (a replicated diffraction grating) was separated from the master and used as a test sample. The first order diffraction efficiency of the test sample was measured by the procedure described by Beesley et al in J. Applied Optics, Vol. 9, No. 12, December 1970, p. 2720, and the diffraction efficiency of the test sample was calculated. The test sample was then placed in a forced air circulating oven at 130° C. for one hour. After this heat treatment, the first order diffraction efficiency was again measured and the percent difference from the original value was taken as the measure of the resistance of the test sample to thermal distortion.

The diffracting grating test samples were also used to determine the gel swell of the crosslinked polymers as an indication of the degree of crosslinking thereof (although the gel swell of the cured film samples could also have been used for this purpose). The gel swell was determined by immersing a sample portion of known weight, $W_1$ (about 0.5 g), of the diffraction grating test sample in 25 ml tetrahydrofuran solvent (analytical reagent grade) for 24 hours at about 23° C., removing the resulting swelled sample portion, wiping or padded off the adhering film of solvent from the sample portion and quickly determining its weight, $W_2$. The used solvent was evaporated to dryness and the weight, $W_3$, of the dried residue (the solubilized fraction of the sample portion) was determined. The weight percent gel swell of the tested crosslinked polymer was calculated by the formula:

$$\% \text{ gel swell} = \frac{W_2 - W_3}{W_1} \times 100$$

The lower the percent gel swell, the greater the degree of crosslinking (see "Encyclopedia of Polymer Technology", Vol. 4, p. 63–65, published by Interscience Pub. (1966)).

EXAMPLE 1

Into a 1-liter metal reactor, equipped with a propeller agitator, therm meter, addition funnel, and dry air sparger extending into the reactor through the lid thereof, were charged 200 g (0.25 mole) poly(dimethylsiloxane)diol silicone fluid ("Dow Corning" Q4-3557), 210 g (1.60 moles) 2-hydroxyethyl methacrylate, and 0.3 g of dibutyltin dilaurate. The mixture was heated to 65° C. and 220 g (0.99 mole) isophorone diisocyanate (IPDI") was added over a two-hour period. The reaction was complete in 16 hours as determined by infrared analysis for isocyanate. The resulting acrylate-capped polysiloxane urethane oligomer product had a structure essentially that of formula XXI. Eighty parts of the oligomer product was diluted with 20 parts 2-(N-butylcarb myl)ethyl methacrylate diluent monomer and the diluted oligomer product was cured to form film and diffraction grating test samples, the properties of which are set forth in TABLE III.

EXAMPLE 2

Into a 1-liter reactor, equipped as described in Example 1, was charged 157 g (0.60 mole) methylenebis(4-cyclohexylisocyanate) ("Hylene" WS). Then, while stirring, there were added, over a period on one hour, a mixture of 288 g (0.12 mole) poly(dimethylsiloxane)diol silicone fluid ("Dow Corning" Q4-3667) and 1.83 g (0.03 mole) 2-aminoethanol chain-extender, and the temperature of the resulting mixture was allowed to rise to 70° C. The reaction was allowed to proceed for an additional hour at which time 131 g (1.00 mole) 2-hydroxyethyl methacrylate was added to the resulting isocyanate-terminated, chain-extended, urea-urethane prepolymer product. The mixture was held at 70° C. and the reaction was complete in 12 hours as determined by infrared analysis, whereupon 248 g (1.08 moles) 2-(N-butylcarbamyl)ethyl methacrylate diluent monomer was added. Infrared analysis verified that the resulting acrylate-capped, chain-extended, polycaprolactone urea-urethane oligomer product (excluding the diluent monomer) had essentially the structure of formula XXXIII. Cured film and diffraction grating test samples were prepared and their compositions and properties are set forth in Table III.

EXAMPLE 3

Into a 1-liter reaction vessel, equipped as in Example 1, were charged 120 g (0.46 mole) methylenebis(4-cyclohexylisocyanate) ("Hylene" WS) and 0.25 g of dibytyltin dilaurate, and the mixture heated to 65°-70° C. while stirring. There was then added over a period of one hour a mixture of 219 g (0.091 mole) poly(dimethylsiloxane)diol silicone fluid ("Dow Corning" Q4-3667) and 46 g (0.023 mole) poly(oxypropylene)diamine ("Jeffamine" D-2000) and the resulting mixture heated with stirring for an additional hour at 70° C. To the stirring mixture containing the resulting isocyanate-terminated, polysiloxane-polyether, urea-urethane prepolymer product was added 131 g (1 mole) 2-hydroxyethyl methacrylate and the resulting mixture was heated for three hours whereupon it was found by infrared analysis that all the isocyanate therein had disappeared. As verified by infrared analysis, the resulting acrylate-capped, polysiloxane-polyether, urea-urethane oligomer product had essentially the structure of formula XXXII.

Films and diffraction grating test samples were prepared using 70 parts of the above oligomer product diluted with 30 parts 2-(N-butylcarbamyl)ethyl methacrylate, the compositions and properties of these articles being set forth in TABLE III.

EXAMPLE 4

In a 4-liter reactor, equipped as in Example 1, a mixture of 15.1 g (0.13 mole) 1,6-hexamethylenediamine and 1250 g (0.52 mole) poly(dimethylsiloxane)diol silicone fluid("Dow Corning" Q4-3667) was added during a one-hour period to a mixture of 572 g (2.58 mole) isophorone diisocyanate ("IPDI") and 2 g of dibutyltin dilaurate while maintaining the temperature of the reactor contents at 65°-70° C. The mixture was heated at this temperature for an additional two hours to obtain the isocyanate-terminated polysiloxane, urea-urethane prepolymer product, and 536 g (2.76 moles) 2-hydroxyethyl methacrylate was then added over a one hour period. The resulting mixture was allowed to react at 65°-70° C. until the disappearance of isocyanate, as determined by infrared analysis, was observed, the period of reaction so required being 48 hours. Infrared analysis verified that the resulting acrylate-capped, polyester, urea-urethane oligomer product had essentially the structure of formula XXIV. The mixture was cooled, 593 g (2.57 moles) 2-N-butylcarbamyl)ethyl methacrylate diluent monomer was added, and film and diffraction grating test samples were prepared from the diluted oligomer product, the compositions and properties of these articles being set forth in TABLE III.

TABLE III

| Ex. | Cured product composition (calc) Amount of Segments, % | | | Physical properties of cured film[a] | | | Gel swell wt. % | First order diffraction efficiency | | | Optical Properties[b] | |
| --- | --- | --- | --- | --- | --- | --- | --- | --- | --- | --- | --- | --- |
| | "S" | "H" | "Linking" | Tensile strength kg/cm² | Elastic modulus kg/cm² | Elongation % | | Before heating | After heating | Change upon heating | Transmission % | Haze % |
| 1 | 25.4 | 27.9 | 46.7 | 240 | 4600 | 9 | 76 | 27.6 | 25.8 | −6.5 | 91.2 | 1.4 |
| 2 | 34.9 | 19.2 | 45.9 | 170 | 3200 | 24 | — | 26.3 | 25.9 | −1.6 | 91.9 | 1.8 |
| 3 | 36.0 | 16.3 | 47.7 | 160 | 2900 | 51 | 81 | 25.5 | 25.4 | −0.3 | 91.8 | 3.4 |
| 4 | 42.1 | 19.8 | 38.1 | 150 | 2300 | 28 | 85 | 23.8 | 23.8 | 0 | 90.1 | 8.2 |

[a]These properties were determined according to ASTM D 1708, using a crosshead speed of 12-in/min (30-cm/min).
[b]These properties were determined according to ASTM D 1003.

Various modifications and alterations of this invention will become apparent to those skilled in the art without departing from the scope and spirit of this invention.

What is claimed is:

1. An oligomeric composition comprising oligomers of the formula:

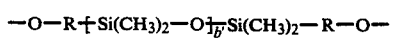

where each
α is independently 1 or 2,
β is zero or a number up to 20 and has an average value up to about 5,
γ is 2 or 3,
"E" is represented by the one or more of the following formulas:

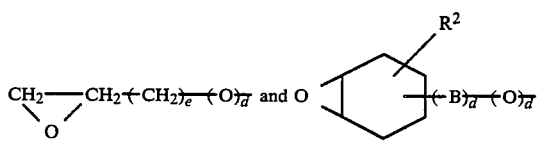

where
$R^2$ is hydrogen or a lower alkyl,
B is

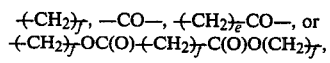

each f is an integer of 2 to 5,
each d is independently zero or 1, and
e is an integer of 1 to 5,
"H" is represented by one or more of the formulas

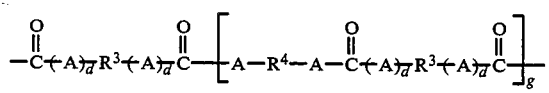

where
each A is independently —NH— or —O—,
d is as defined above,
g is zero or a number up to 5,
each $R^3$ is independently a di-valent carbocyclic-containing radical derived from benzene, naphthalene, cyclohexane, dicyclohexylmethane, diphenylmethane, or norbornene, and their lower alkyl-substituted derivatives, by removal of two of their hydrogen atoms, and each $R^4$ is independently an alkylene moiety with 2 to 10 carbon atoms, or a cycloalkylene moiety with 6 to 10 carbon atoms, and

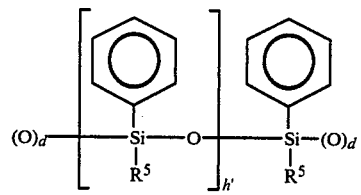

where
d is as defined above,
h' is zero or an integer of 1 to 10, and
$R^5$ is independently phenyl or methyl,
and "S" is the polysiloxane residue remaining after removal of the active hydrogen atoms of the corresponding polyols or polyamines.

2. The oligomer composition of claim 1 where "S" is represented by one or more of the formulas

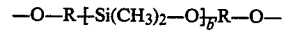

where b' is a number of 6 to 35, and R is a linear or branched alkylene group having 1 to 12 carbon atoms or a polyoxyalkylene group having 4 to 80 carbon atoms and 1 to 40 oxygen atoms, and

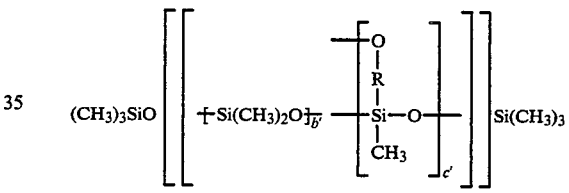

where the groups enclosed by the single brackets with subscripts b' and c' are repeating units randomly distributed within the double bracket, b' being a number of 6 to 35 and c' being 2 or 3, and R is as defined above.

3. An oligomeric composition according to claim 1 where "H" is represented by the formula:

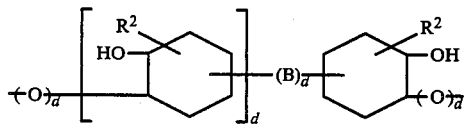

where $R^2$, B, and d are as defined in claim 1.

4. An oligomeric composition according to claim 1 where α is 2.

* * * * *